(12) United States Patent
Yamashita et al.

(10) Patent No.: US 9,738,348 B2
(45) Date of Patent: Aug. 22, 2017

(54) SADDLE TYPE VEHICLE

(71) Applicant: HONDA MOTOR CO., LTD., Tokyo (JP)

(72) Inventors: Akihiro Yamashita, Wako (JP); Jun Hariu, Wako (JP); Takanori Ishii, Wako (JP); Shunichi Nakajima, Wako (JP); Daisuke Umikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 262 days.

(21) Appl. No.: 14/666,809

(22) Filed: Mar. 24, 2015

(65) Prior Publication Data
US 2015/0274254 A1 Oct. 1, 2015

(30) Foreign Application Priority Data

Mar. 26, 2014 (JP) .................... 2014-063099

(51) Int. Cl.
*B62M 7/06* (2006.01)
*B62K 11/04* (2006.01)
*F02M 35/10* (2006.01)
*F02M 35/116* (2006.01)
*F02M 35/16* (2006.01)
*F02M 35/02* (2006.01)
*B62K 19/18* (2006.01)
*F02M 35/024* (2006.01)

(52) U.S. Cl.
CPC .............. *B62M 7/06* (2013.01); *B62K 11/04* (2013.01); *B62K 19/18* (2013.01); *F02M 35/0201* (2013.01); *F02M 35/10288* (2013.01); *F02M 35/116* (2013.01); *F02M 35/162* (2013.01); *F02M 35/02491* (2013.01)

(58) Field of Classification Search
CPC .......... B62M 7/06; B62K 11/04; B62K 19/18
See application file for complete search history.

(56) References Cited

U.S. PATENT DOCUMENTS

| | | | | |
|---|---|---|---|---|
| 4,412,597 A | * | 11/1983 | Aiba | B62M 7/02 180/228 |
| 4,813,511 A | * | 3/1989 | Yamaguchi | B62K 11/04 180/219 |
| 4,827,721 A | * | 5/1989 | Hayashi | F16H 39/10 60/487 |
| 4,845,951 A | * | 7/1989 | Hayashi | F16H 39/14 188/300 |

(Continued)

FOREIGN PATENT DOCUMENTS

JP 2009-292467 A 12/2009

*Primary Examiner* — Tony Winner
*Assistant Examiner* — Michael R Stabley
(74) *Attorney, Agent, or Firm* — Birch, Stewart, Kolasch & Birch, LLP

(57) ABSTRACT

A saddle type vehicle to improve the workability in fastening a frame and an engine together and thereby to enhance productivity. The saddle type vehicle includes a head pipe, a main frame extending rearwardly from the head pipe, and a seat rail located rearwardly of the main frame for supporting a seat. The main frame is fastened to the engine by fastening members being directed from an outer side toward an inner side in the vehicle widthwise direction. A knock pin is provided between the main frame and the engine, in a position in the vicinity of at least one of the fastening members.

13 Claims, 12 Drawing Sheets

(56) References Cited

U.S. PATENT DOCUMENTS

| | | | | |
|---|---|---|---|---|
| 4,923,027 | A * | 5/1990 | Hayashi | B62L 3/04 180/219 |
| 5,390,758 | A * | 2/1995 | Hunter | B62K 11/04 180/227 |
| 6,315,072 | B1 * | 11/2001 | Brown | B62K 11/04 180/219 |
| 7,004,135 | B2 * | 2/2006 | Tsutsumi | F02N 3/04 123/179.24 |
| 7,089,905 | B2 * | 8/2006 | Tsutsumi | F01M 1/02 123/196 R |
| 7,131,412 | B2 * | 11/2006 | Tsutsumi | F02N 15/006 123/179.25 |
| 7,174,800 | B2 * | 2/2007 | Kawakubo | F16H 63/18 74/325 |
| 7,198,021 | B2 * | 4/2007 | Kawakubo | F16H 57/02 123/198 P |
| 8,555,739 | B2 * | 10/2013 | Ieda | F16H 63/14 74/335 |
| 2007/0056551 | A1 * | 3/2007 | Nakatsuka | F16H 57/0421 123/197.1 |
| 2009/0308677 | A1 * | 12/2009 | Castellani | B62K 11/04 180/219 |
| 2014/0345549 | A1 * | 11/2014 | Isechi | F02F 1/102 123/41.74 |

* cited by examiner

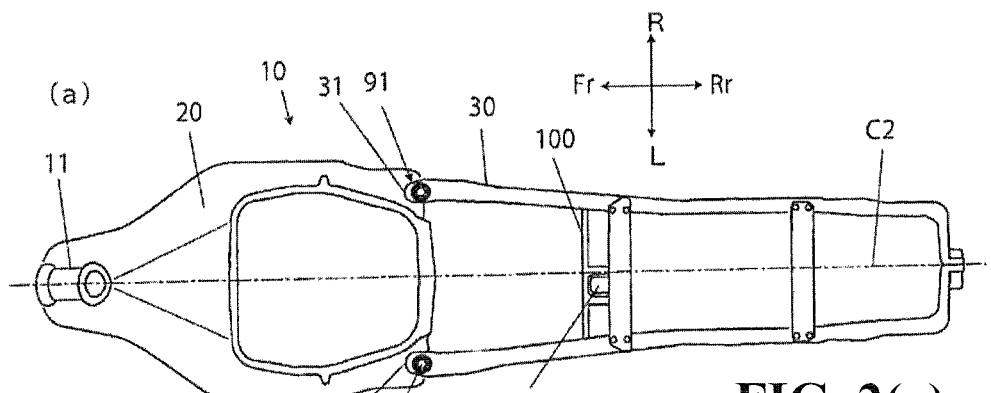
FIG. 2(a)
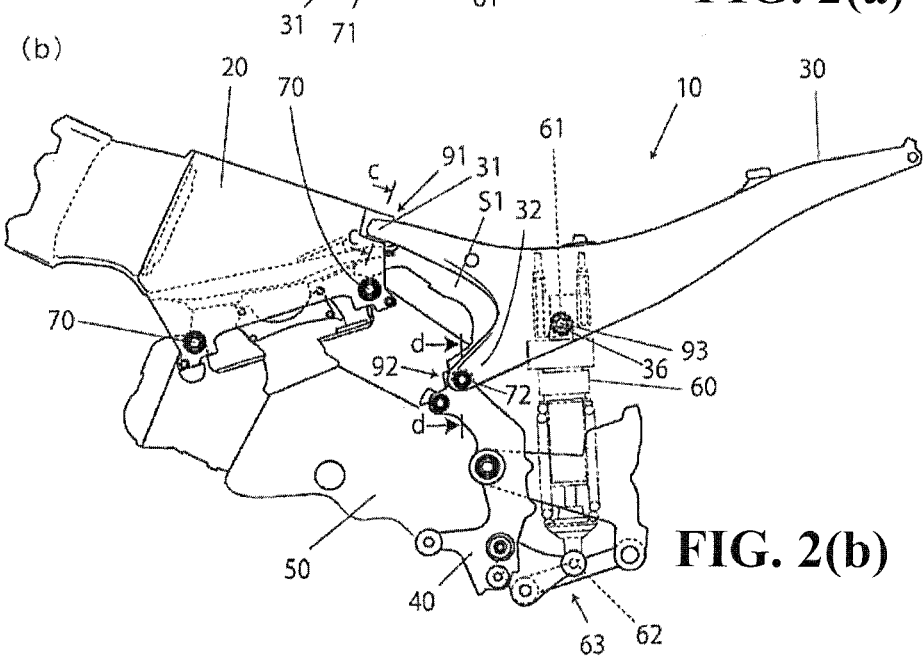
FIG. 2(b)
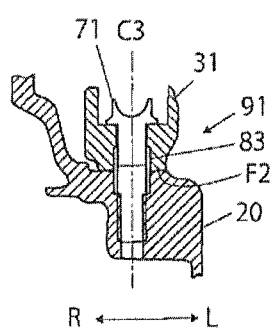 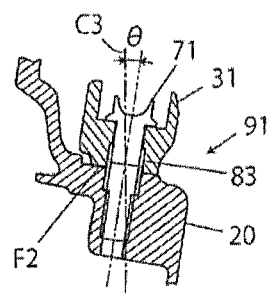 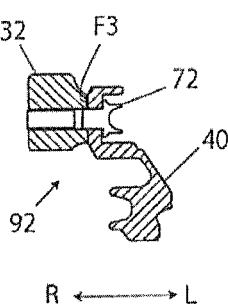
FIG. 2(c)  FIG. 2(c')  FIG. 2(d)

SADDLE TYPE VEHICLE

CROSS-REFERENCE TO RELATED APPLICATIONS

The present application claims priority under 35 USC 119 to Japanese Patent Application No. 2014-063099 filed Mar. 26, 2014 the entire contents of which are hereby incorporated by reference.

BACKGROUND OF THE INVENTION

1. Field of the Invention

The present invention relates to a saddle type vehicle.

2. Description of Background Art

A saddle type vehicle is known wherein a split frame is divided into front and rear frame portions and in which the front frame portion and an engine are fastened together by fastening members each extending in a radial direction (a direction orthogonal to the vehicle widthwise direction). See, for example, Japanese Patent Laid-Open No. 2009-292467.

In the conventional saddle type vehicle mentioned above, the fastening between the front frame portion and the engine is made by use of fastening members which are each directed in a radial direction (a direction orthogonal to the vehicle widthwise direction). This configuration lowers the workability in fastening the frame member and the engine together, and thereby leads to a lowered productivity.

SUMMARY AND OBJECTS OF THE INVENTION

It is a problem to be solved by an embodiment of the present invention to provide a saddle type vehicle which makes it possible to improve the workability in fastening a frame and an engine together and thereby to realize an enhanced productivity.

In order to solve the above problem, there is provided a saddle type vehicle according to an embodiment of the present invention that includes:

a head pipe;

a main frame extending rearwardly from the head pipe; and a seat rail located rearwardly of the main frame, the seal rail is adapted to support a seat;

wherein the main frame is fastened to an engine by a fastening member directed from an outer side toward an inner side in a vehicle widthwise direction; and a knock pin is provided between the main frame and the engine, in a position in a vicinity of the fastening member.

According to this saddle type vehicle, the main frame is fastened to the engine by the fastening members directed from an outer side toward an inner side in the vehicle widthwise direction. This ensures that the working direction in fastening the frame and the engine together coincides with the vehicle widthwise direction. Consequently, the workability is improved, and an enhanced productivity is realized.

If the fastening members are provided merely along the vehicle widthwise direction, loads generated in the longitudinal direction of the vehicle at the time of such operations as the starting and the stopping of the vehicle are received by those portions (belly portions) of the fastening members which are perpendicular to the axial direction of the fastening members. For this reason, the fastening members themselves are required to be high in strength, which may lead to a rise in cost.

On the other hand, according to the saddle type vehicle of an embodiment of the present invention, the knock pin is provided between the main frame and the engine in the position in the vicinity of at least one of the fastening members. This ensures that the loads generated in the longitudinal vehicle direction at the time of such operations as the starting and the stopping of the vehicle are received by the knock pin. In addition, an operation of mounting the knock pin is easier to carry out than the operation of fastening by the fastening member.

Thus according to the saddle type vehicle of an embodiment of the present invention, an improved workability and an enhanced productivity can be realized. At the same time, it is possible to cope with the loads generated in the longitudinal direction of the vehicle at the time of such operations as the starting and the stopping of the vehicle, without considerably enhancing the strength of the fastening members themselves.

In the saddle type vehicle as described above, a configuration may be adopted wherein the main frame and the seat rail are separate bodies from each other, and the fastening member is provided only on the main frame, and is provided at each of four parts including front left, front right, rear left, and rear right parts of a lower portion of the main frame.

This configuration makes it possible to restrain an influence of external forces applied to the main frame from being exerted on the seat rail, and also to restrain an influence of external forces applied to the seat rail from being exerted on the main frame. Consequently, it is possible to more favorably cope with the loads generated in the longitudinal vehicle direction at the time of such operations as the starting and the stopping of the vehicle.

In the saddle type vehicle according to an embodiment of the present invention, a first knock pin set along a direction orthogonal to the vehicle widthwise direction and/or a second knock pin set along the vehicle widthwise direction may be provided as the knock pin.

When this configuration is adopted, it is possible, by appropriately providing the first and/or second knock pin, to cope with loads generated in the longitudinal and widthwise directions of the vehicle, and to prevent (or at least remarkably suppress) slippage at fitting surfaces.

In the saddle type vehicle according to an embodiment of the present invention, a configuration may be adopted wherein the first knock pin is provided at each of front-side two or rear-side two of the fastening member provided at the four parts including the front left, front right, rear left, and rear right parts of the lower portion of the main frame, the first knock pin being located under the fastening member.

With this configuration, it is possible to prevent slippage at the fitting surfaces from occurring when a reaction force from a road surface is inputted, while minimizing a rise in cost.

If it is intended to provide the first knock pins at all of the above-mentioned four parts, a high dimensional accuracy would be demanded among the component parts concerned, leading to a rise in cost.

In the case where the first knock pins are arranged at the front-side two or the rear-side two of the above-mentioned four parts, on the other hand, it is possible to prevent slippage at the fitting surfaces from occurring when a reaction force from a road surface is inputted, while reducing a rise in cost as much as possible.

In the saddle type vehicle according to an embodiment of the present invention, a configuration may be adopted in which:

the second knock pin is provided under the fastening member at the four parts including the front left, front right, rear left, and rear right parts of the lower portion of the main frame; and the second knock pin includes a male screw portion and a fitting portion, the male screw portion being for screw coupling with a female screw portion provided in the main frame, the fitting portion being located more to a tip side than the male screw portion and being for fitting to a fitting portion provided in the engine.

With such a configuration according to an embodiment of the present invention, the fitting of the second knock pin and the engine to each other ensures that a force tending to rotate the main frame about the fastening member can be further reduced.

In addition, although the second knock pins are provided at the four parts including the front left, front right, rear left, and rear right parts, all the second knock pins are directed in the vehicle widthwise direction, so that they do not deteriorate workability. In addition, the female screw portions in the main frame and the fitting portions in the engine are provided along the same direction, so that they can be easily produced with a high accuracy. Thus, the configuration in which the second knock pins are used would not readily lead to a rise in cost.

In the saddle type vehicle according to an embodiment of the present invention, the first knock pin may be located between the fastening member and the second knock pin, in a longitudinal direction of the vehicle.

Such a configuration ensures that the first knock pin is provided in such a position that the gap between the fitting surfaces would not easily be enlarged when a force tending to cause slippage on the fitting surfaces is exerted. Consequently, the preventive effect of the first knock pin on slippage at the fitting surfaces is enhanced.

In the saddle type vehicle according to an embodiment of the present invention, the engine may have a V-bank configuration in which cylinders are arranged in a V-shape in a side view, in which a rear portion of a front bank and a front portion of a rear bank are fastened by the fastening member, and in which the fastening member, the first knock pin, and the second knock pin are arranged in this order along a direction from a center line of the V-bank configuration toward an outer side in the longitudinal direction of the vehicle.

When the saddle type vehicle is configured in this fashion, an external appearance that is symmetric with respect to the center line of the V-bank configuration can be obtained, and an enhanced assemblability is realized.

In the saddle type vehicle according to an embodiment of the present invention, a configuration may be adopted in which:

a mating surface between the main frame and the engine where the first knock pin is accommodated is provided in each of four places including front left, front right, rear left, and rear right places; and the mating surface and the center line of the V-bank configuration are orthogonal to each other in a side view.

This configuration ensures that an external appearance which is symmetrical with respect to the center line of the V-bank configuration can be obtained, and an enhanced assemblability is realized.

In the saddle type vehicle according to an embodiment of the present invention, a configuration may be adopted wherein an intake funnel is provided between the cylinders arranged in the V-shape in the side view, the intake funnel is opening into an air cleaner case formed inside the main frame, and a dirty side of the air cleaner case is provided with a water drain hole through which to release water that tends to accumulate in the dirty side.

This configuration permits an efficient utilization of the main frame.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2(a) to 2(d) illustrate a frame structure of the embodiment, wherein FIG. 2(a) is a partly omitted plan view, FIG. 2(b) is a side view, each of FIGS. 2(c) and 2(c') is a sectional view taken along line c-c of FIG. 2(b), and FIG. 2(d) is a sectional view taken along line d-d of FIG. 2(b);

FIGS. 12(a) and 12(b) illustrate the cross member 100, wherein FIG. 12(a) is a plan view, and FIG. 12(b) is a right side view relevant to FIG. 12(a).

DETAILED DESCRIPTION OF THE PREFERRED EMBODIMENTS

Figure 1:
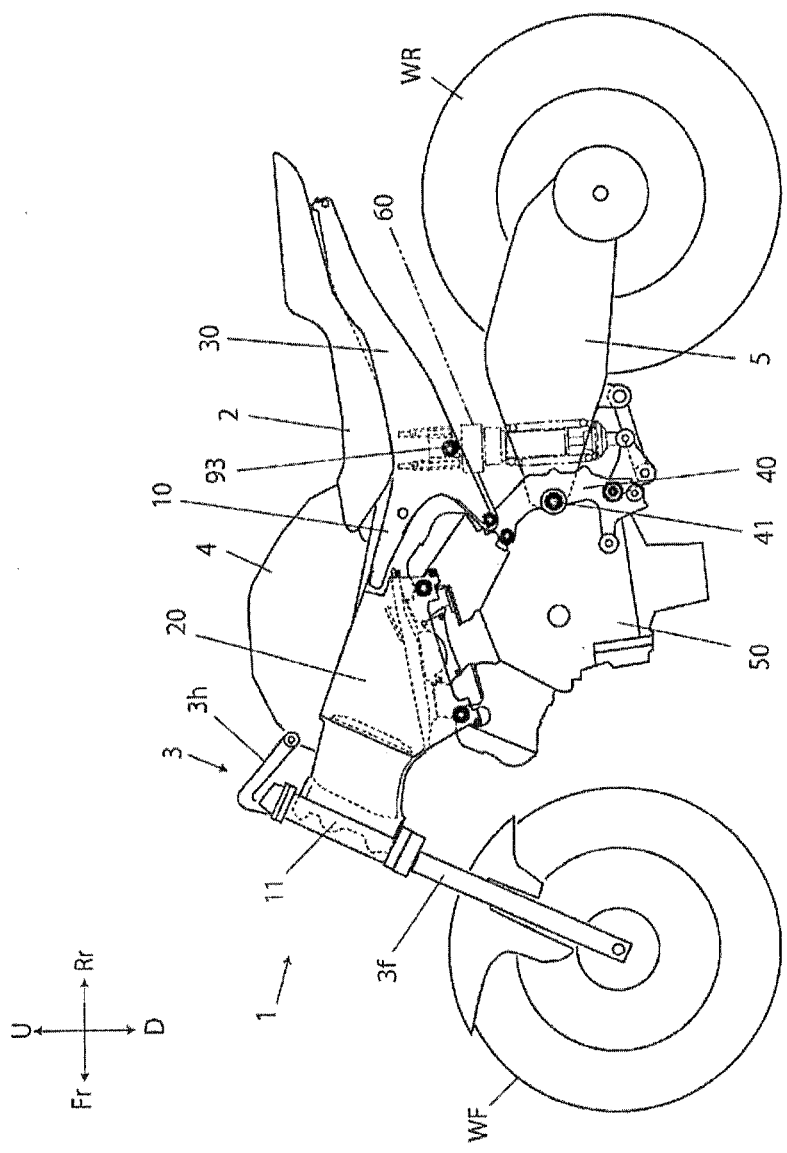
FIG. 1 is a side view showing an exemplary embodiment of a saddle type vehicle of the present invention.

An embodiment, disclosed by way of example, of the saddle type vehicle according to the present invention will now be described below referring to the drawings. The drawings should be viewed according to the orientation of the reference characters. In the following description, the frontward and rearwardly directions, the leftward and rightward directions, and the upward and downward directions are those as viewed from a driver, and, if necessary, characters Fr, Rr, L, R, U, and D standing for frontward, rearward, leftward, rightward, upward and downward directions of the vehicle are indicated in the drawings. In the drawings, the identical or corresponding parts are denoted by the same reference characters.

A saddle type vehicle depicted in FIG. 1 is a motorcycle includes a body frame 10.

The body frame 10 includes a head pipe 11, a main frame 20 extending rearwardly therefrom, seat rails 30 located rearwardly of the main frame 20 and supporting a seat 2, and pivot plates 40 connected to the seat rails 30.

A steering system 3 having a handlebar 3h and a front fork 3f is rotatably supported on the head pipe 11, and a front wheel WF is rotatably supported on lower ends of the front fork 3f.

A fuel tank 4 is mounted to an upper portion of the main frame 20.

A swing arm 5 swingable about a pivot 41 is mounted to the pivot plates 40 through the pivot 41, and a rear wheel WR is rotatably mounted to a rear end of the swing arm 5.

An engine 50 is provided for driving the rear wheel WR, and numeral 60 denotes a shock absorber for damping vibrations attributable to a road surface.

Figure 3:
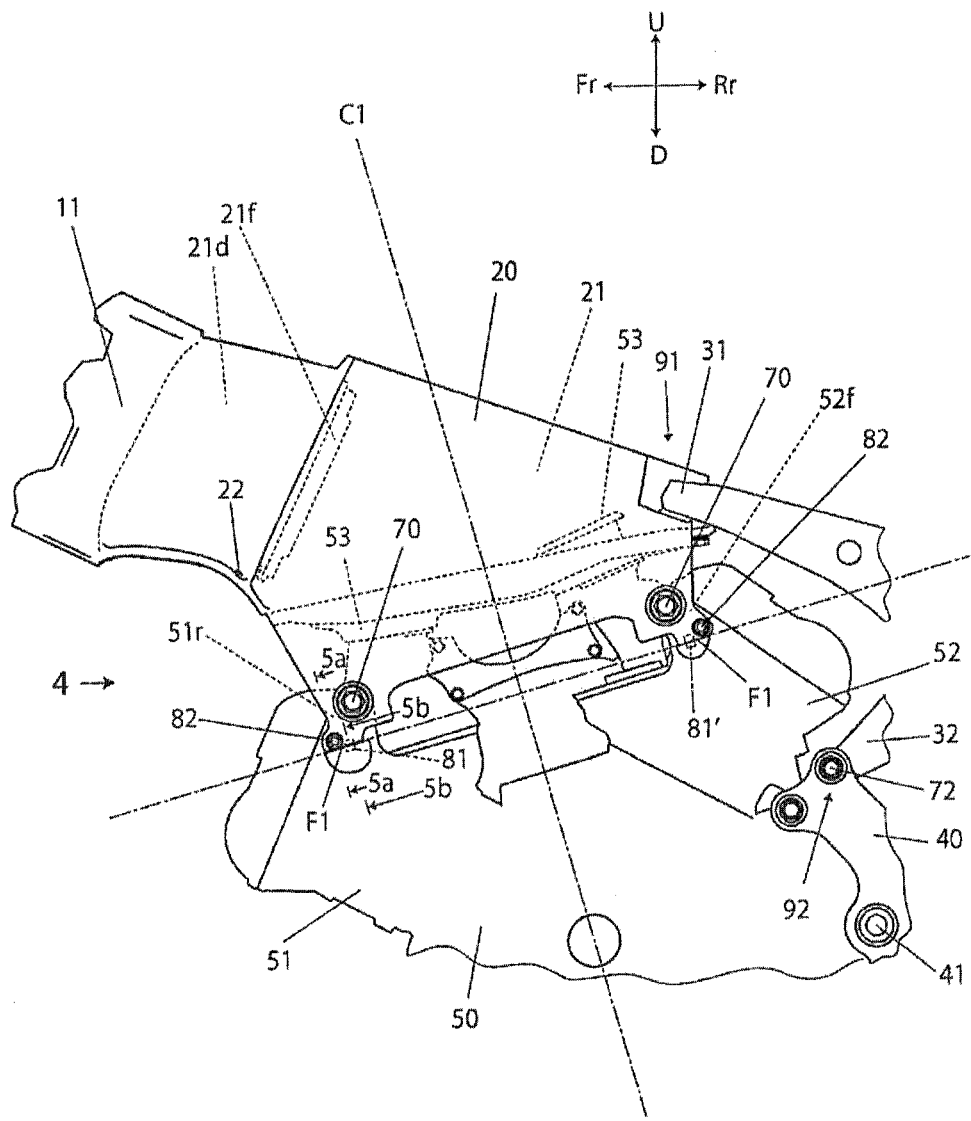
FIG. 3 is a side view showing mainly a main frame 20.
Figure 4:
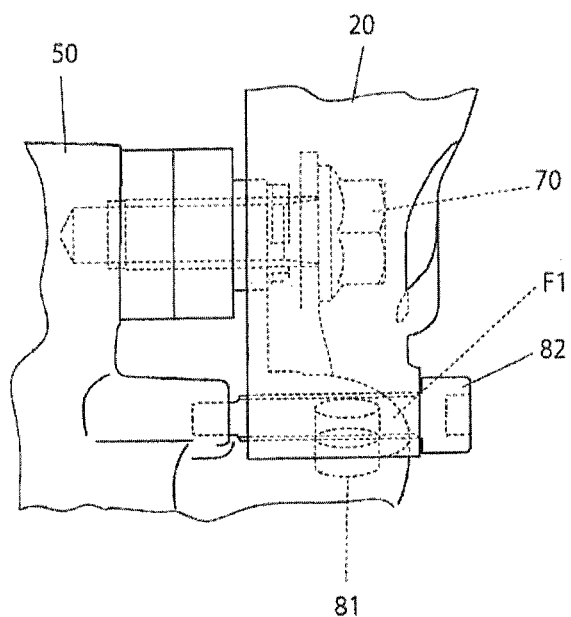
FIG. 4 is a partly omitted view along arrow 4 of FIG. 3.
Figure 4:
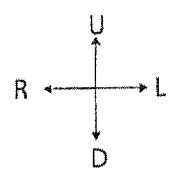

As illustrated in FIGS. 3 and 4, the main frame 20 is fastened to the engine 50 by fastening members 70 which are directed from an outer side toward an inner side in the vehicle widthwise direction. The fastening member 70 may be composed of a bolt.

In a position in the vicinity of the fastening member 70, a knock pin (81 and/or 81') is provided between the main frame 20 and the engine 50. The knock pin may be provided in a position or positions in the vicinity of at least one of the fastening members 70. It is desirable, however, for the knock pins to be provided at a total of four parts including front left, front right, rear left, and rear right parts of the main frame 20 as described later.

As shown also in FIG. 2, the main frame 20 and the seat rails 30 are separate bodies from each other, and the fastening members 70 are provided only on the main frame 20. The fastening members 70 are provided at the four parts including the front left, front right, rear left, and rear right parts of a lower portion of the main frame 20. While the fastening members 70 at the front and rear parts on the left side appear in FIG. 3, the fastening members 70 on the right side are also provided similarly.

In this exemplary embodiment, a first knock pin 81 set along a direction orthogonal to the vehicle widthwise direction and/or a second knock pin 82 set along the vehicle widthwise direction are provided as the knock pin.

The first knock pins 81 are provided near the front-side two or rear-side two of the fastening members 70 provided at the four parts including the front left, front right, rear left, and rear right parts of a lower portion of the main frame 20, the first knock pins 81 being located under the respective fastening members 70. While the first knock pins 81 are provided at the front-side two parts (only the part on the left side is shown in FIG. 3) of the lower portion of the main frame 20, they may be provided at the rear-side two parts (only the part on the left side is shown in FIG. 3) of the lower portion of the main frame 20 as indicated by imaginary line 81' in FIG. 3.

Figures 5A, 5B:
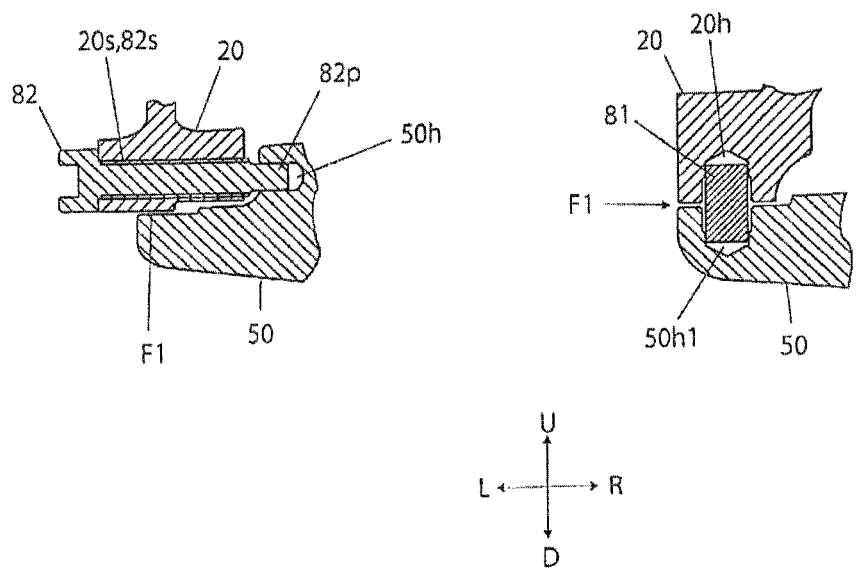
FIG. 5(a) is a partly omitted sectional view taken along line 5a-5a of FIG. 3.
FIG. 5(b) is a partly omitted sectional view taken along line 5b-5b of FIG. 3.

As illustrated in FIG. 5(b), each first knock pin 81 is fitted both to a fitting hole 20h provided in the main frame 20 and to a fitting hole 50h1 provided in the engine 50.

The second knock pins 82 are provided under the respective fastening members 70 provided at the four parts including the front left, front right, rear left, and rear right parts of the lower portion of the main frame 20. As shown in FIG. 5(a), each second knock pin 82 has a male screw portion 82s for screw coupling with a female screw portion 20s provided in the main frame 20, and a fitting portion (pin portion) 82p which is located more to a tip side than the male screw portion 82s and which fits to a fitting portion 50h provided in the engine 50.

As depicted in FIG. 3, the first knock pin 81 is provided between the fastening member 70 and the second knock pin 82, in the longitudinal direction of the vehicle.

The engine 50 has a V-bank configuration in which cylinders 51 and 52 are arranged in a V-shape in a side view. A rear portion 51r of a front bank 51 and a front portion 52f of a rear bank 52 are fastened to the main frame 20 by the fastening members 70. The fastening member 70, the first knock pin 81, and the second knock pin 82 are sequentially arranged in this order from a center line C1 of the V-bank configuration toward an outer side in the longitudinal direction of the vehicle.

As shown in FIG. 3, the motorcycle in this exemplary embodiment has mating surfaces F1 (see FIG. 5(b)), each of which is formed between the main frame 20 and the engine 50 and at each of which the first knock pin 81 is accommodated, in four places including front left, front right, rear left, and rear right places (only the left-side two places are depicted in FIG. 3). The mating surface F1 and the center line C1 of the V-bank configuration are orthogonal to each other in a side view.

Figure 6:
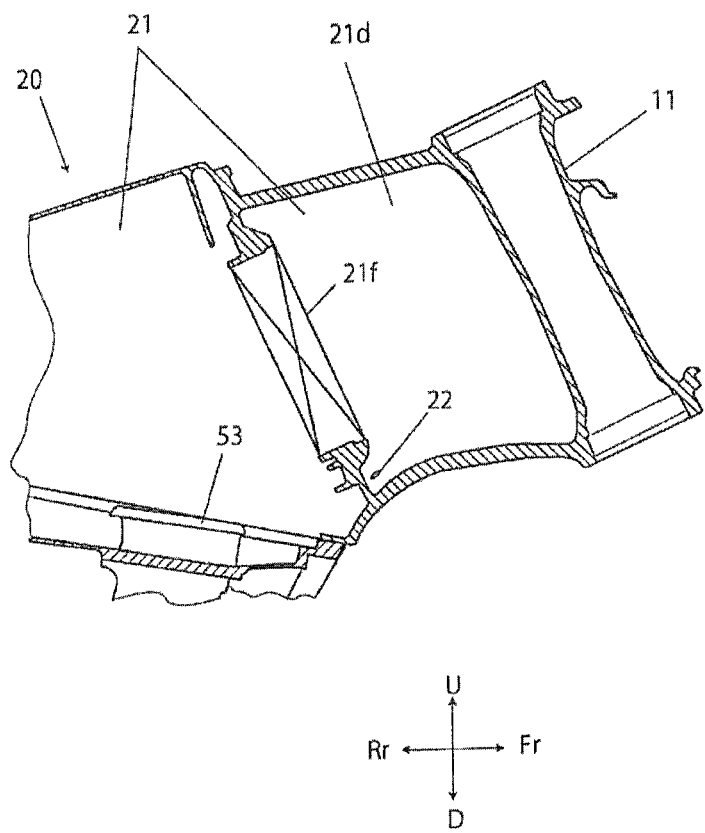
FIG. 6 is a partly omitted sectional view of the main frame 20 (a partly omitted sectional view taken along line 6-6 of FIG. 7)

An intake funnel 53 is provided between the cylinders 51 and 52 arranged in the V-shape in a side view. The intake funnel 53 opens into an air cleaner case 21 (see FIG. 6) formed inside the main frame 20. A dirty side 21d of the air cleaner case 21 is provided with a water drain hole 22 through which to release water that tends to accumulate in the dirty side 21d.

Figure 7:
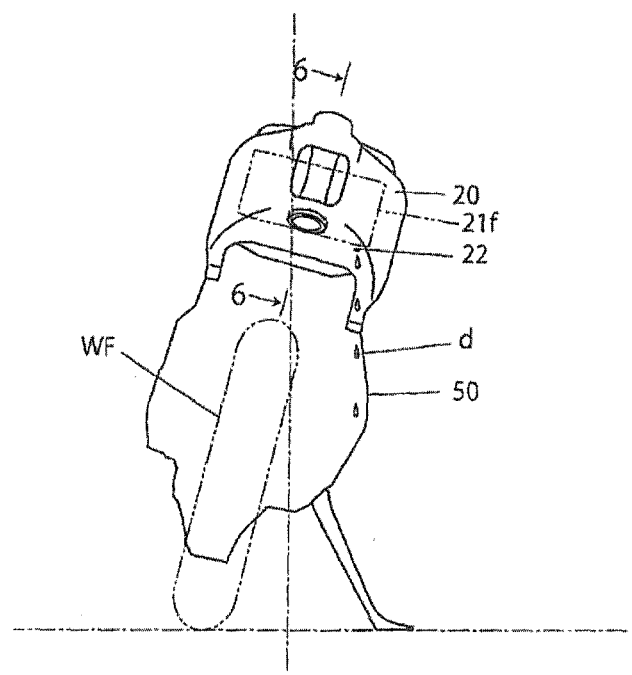
FIG. 7 is a schematic front view of a frame for explanation of an operation.
Figure 7:
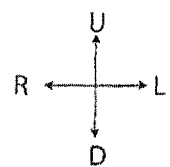

The water drain hole 22 is provided below a filter paper or sponge of a filter element 21f. This makes it possible to prevent submersion of the filter paper or sponge of the filter element 21f. In addition, as shown in FIG. 7, the water drain hole 22 is provided in a position that coincides with a lower end portion of the dirty side 21d when the vehicle is parked using a side stand. In FIG. 7, waterdrops d are discharged through the water drain hole 22.

Figure 8A:
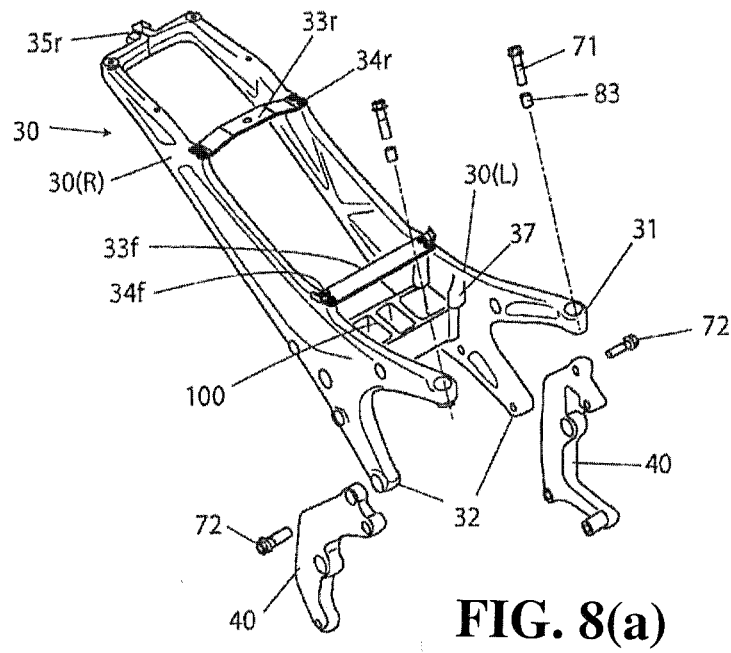
FIG. 8(a) is a perspective view of seat rails 30 and pivot plates 40.

As depicted in FIG. 8(a), the pivot plates 40 are provided as separate bodies from the seat rails 30.

Figure 8B:
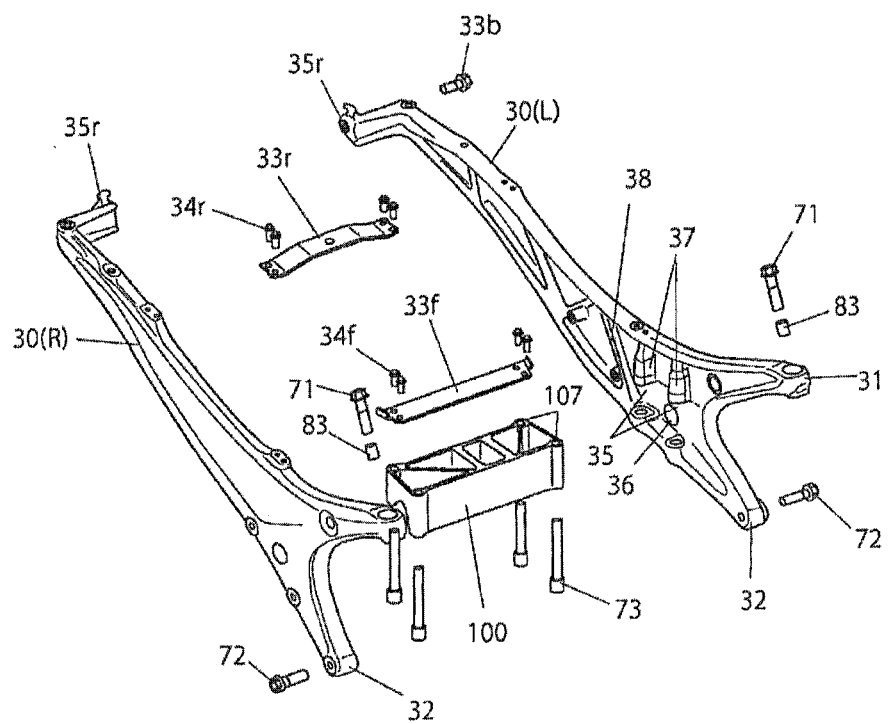
FIG. 8(b) is an exploded perspective view of the seat rails 30.

As shown in FIGS. 8(a) and 8(b), the seat rails 30 are configured by connecting left and right seat rails 30(L, R) together by a front cross plate 33f, a rear cross plate 33r, a rear-end connecting bolt 33b, and a cross member 100 which is to be described later.

The front cross plate 33f couples upper front portions of the left and right seat rails 30(L, R) together by use of fastening bolts 34f.

The rear cross plate 33r couples upper rear portions of the left and right seat rails 30(L, R) together by use of fastening bolts 34r.

The rear-end connecting bolt 33b couples rear-end fastening portions 35r of the left and right seat rails 30(L, R) together.

As shown in FIGS. 8(a) and 8(b) and FIGS. 2 and 3, the seat rail 30 has its one front-side end 31 attached to the main frame 20, and has its other front-side end 32 attached to the pivot plate 40.

The main frame 20 and the seat rails 30 are provided with a first fastening portion 91 at which the fastening is made by a first fastening member 71 in the vertical direction.

The first fastening member 71 is provided along the vertical direction when viewed from the vehicle front side, as depicted in FIG. 2(c). Note that, as depicted in FIG. 2(c'), the first fastening portion 91 also may be fastened obliquely along a direction from an outer side toward an inner side in the vehicle widthwise direction. The inclination angle from the vertical direction in this instance is denoted by θ.

The pivot plate 40 and the seat rail 30 are provided with a second fastening portion 92 at which the fastening is made by a second fastening member 72 in the vehicle widthwise direction.

As shown in FIG. 2(b), an upper end 61 of the shock absorber 60 is connected to the seat rail 30 by an upper-end connecting portion 93. The first fastening portion 91, the second fastening portion 92, and the upper-end connecting portion 93 are arranged in this order from the vehicle front side, in a side view.

Either the first fastening portion 91 or the second fastening portion 92 is provided with a knock pin 83. As shown in FIGS. 2(c) and 2(c'), in this exemplary embodiment the knock pin 83 is provided in the first fastening portion 91. The knock pin 83 is a sleeve-shaped pin in which the first fastening member 71 is inserted.

Figure 9:
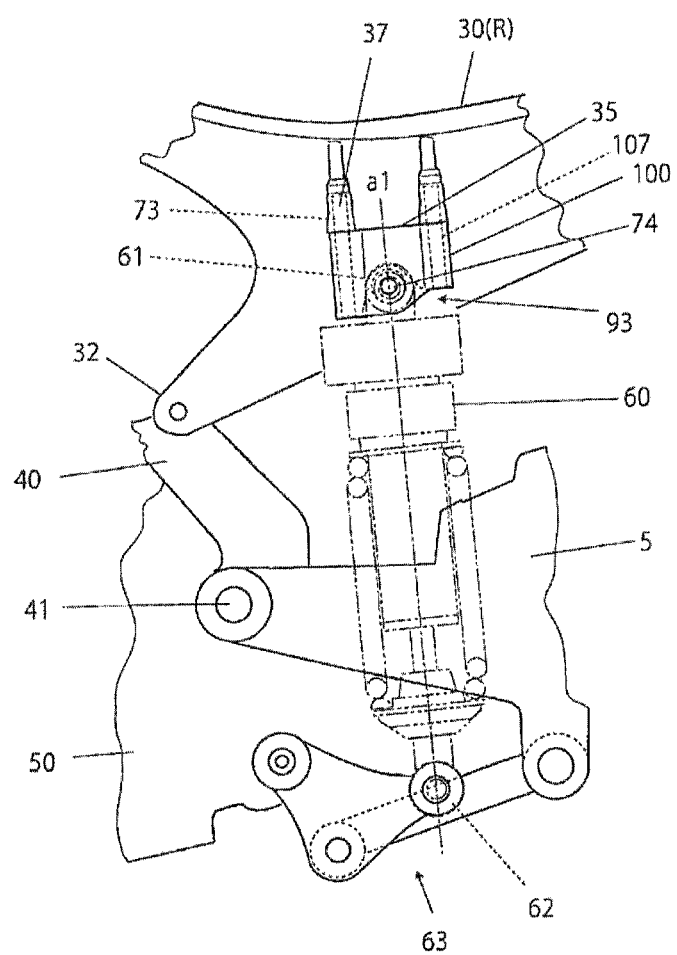
FIG. 9 is a side view showing a mounting structure for a shock absorber 60.

As illustrated in FIGS. 8 and 9, the upper-end connecting portion 93 for the shock absorber 60 is provided on the cross member 100 located between the left and right seat rails 30(L, R).

Figure 11:
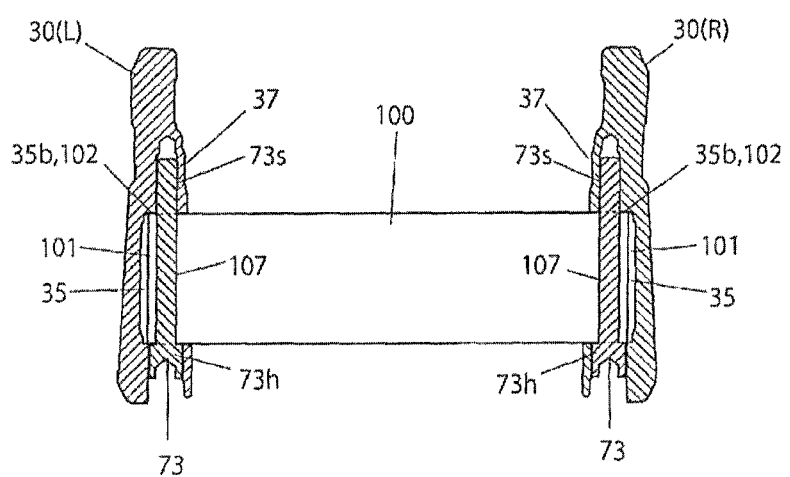
FIG. 11 is a sectional view showing a mounting structure for a cross member 100.
Figure 11:
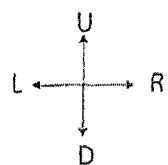

The cross member 100 is a separate body from the seat rail 30. As shown in FIG. 11, the cross member 100 has both its ends 101 supported by recesses 35 formed in the left and right seat rails 30(L, R) at the respective inner sides of the seat rails 30(L, R) so as to face each other, and is fastened to the seat rail 30 by cross member fastening members 73.

An upper surface 35b of the recess 35 forms a fitting surface, and an upper surface 102 of the cross member 100 makes contact with the fitting surface 35b.

The cross member fastening member 73 is set in screw coupling with a screw receiving portion 37 which is provided at an upper portion of the seat rail 30, only at its tip portion 73s, and its other portion and head portion 73h are fitted to a through-hole 107 which is provided in the cross member 100, and a lower portion of the seat rail 30.

The seat rail 30 is produced using a mold whose mold parting direction coincides with the vehicle widthwise direction (L-R direction). The cross member 100 is composed of an extruded member or produced using a mold whose mold parting direction coincides with the vertical direction (U-D direction).

As shown in FIGS. 1 and 2(b), the seat rail 30 is Y-shaped in a side view, and the first fastening portion 91 and the second fastening portion 92 are provided at end portions of the arms of the Y-shape.

Figure 10:
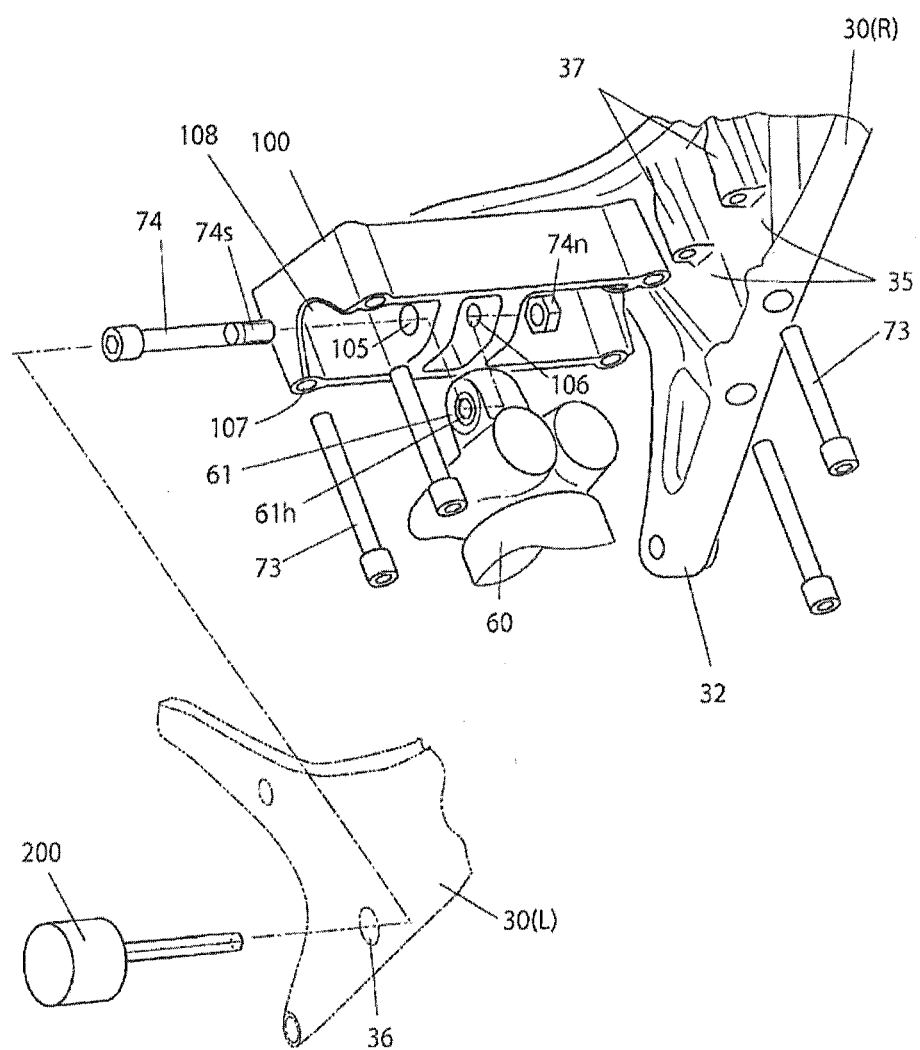
FIG. 10 is a perspective view showing an upper mounting structure for the shock absorber 60.

As illustrated in FIGS. 9 and 10, the shock absorber 60 is connected to the cross member 100 by a shock absorber connecting member 74 provided along the vehicle widthwise direction.

On an extension line of an axial direction of the shock absorber connecting member 74, the seat rail 30 (the left seat rail 30(L) in this embodiment) is provided therein with a tool insertion hole 36 as shown in FIGS. 2(b) and 8(b).

The shock absorber connecting member 74 is a bolt. The bolt is inserted through the tool insertion hole 36 provided in the left seat rail 30(L) toward the cross member 100, then passes through a pass-through hole 105 in the cross member 100, a hole 61h in the upper end 61 of the shock absorber 60, and a through-hole 106 in the cross member 100, and a screw portion 74s at a tip thereof is screw-coupled to a nut 74n.

In FIG. 10, a tool 200 and 108 a tool insertion recess 108 are provided in the cross member 100 for inserting the tool 200 therethrough.

Figures 12A, 12B:
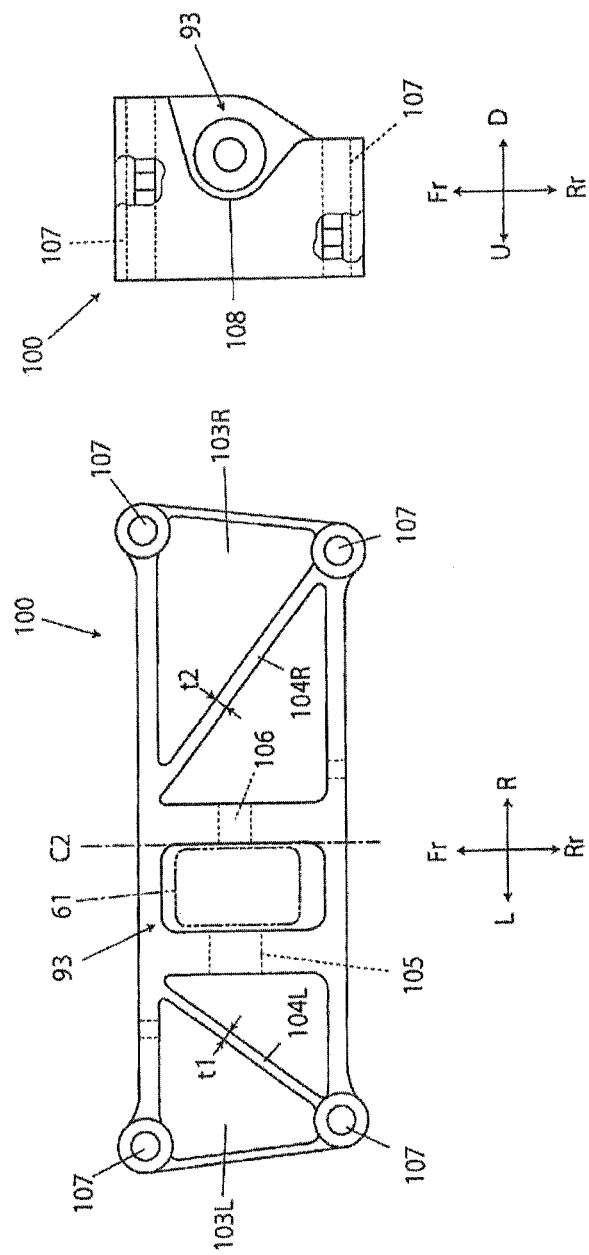

As depicted in FIGS. 2(a) and 12(a), the shock absorber 60 is disposed in a position with an offset toward the side (in the illustrated example, the left side) from which the shock absorber connecting member 74 is inserted, with respect to the vehicle body center line C2.

As shown in FIG. 12(a), the cross member 100 is provided, on outer sides in the vehicle widthwise direction of the upper-end connecting portion 93 for connection with the shock absorber 60, with left and right lightening holes 103L and 103R which are different in size. The lightening holes 103L and 103R are provided with ribs 104L and 104R along a diagonal line thereof, respectively.

The thickness t2 of the rib 104R of the larger lightening hole 103R is greater than the thickness t1 of the rib 104L of the smaller lightening hole 103L.

As shown in FIG. 9, the cross member fastening members 73 are mounted substantially in parallel to an axis a1 of the shock absorber 60.

As depicted in FIG. 9, a lower end 62 of the shock absorber 60 is mounted to the engine 50 and the swing arm 5 by way of a link member 63.

According to the saddle type vehicle configured as above-described, the following operational advantages are obtained.

(1) The main frame 20 is fastened to the engine 50 by the fastening members 70 which are provided along the direction from the outer side toward the inner side in the vehicle widthwise direction. Therefore, the working direction in fastening the frame and the engine 50 together coincides with the vehicle widthwise direction, whereby an improved workability and an enhanced productivity are ensured.

If the fastening members 70 are provided merely along the vehicle widthwise direction, loads generated in the longitudinal vehicle direction at the time of such operations as the starting and the stopping of the vehicle are received by those portions (belly portions) of the fastening members 70 which are perpendicular to the axial direction of the fastening member 70. For this reason, the fastening members 70 themselves are required to be high in strength, which may lead to a rise in cost.

On the other hand, according to the saddle type vehicle in this exemplary embodiment, the knock pin (81 and/or 81' and/or 82) is provided between the main frame 20 and the engine 50 in the position in the vicinity of at least one of the fastening members 70. This ensures that the loads generated in the longitudinal vehicle direction at the time of such operations as the starting and the stopping of the vehicle are received by the knock pin. In addition, an operation of mounting the knock pin is easier to carry out than the operation of fastening by the fastening member 70.

Thus, according to the saddle type vehicle in this embodiment, an improved workability and an enhanced productivity can be realized. At the same time, it is possible to cope with the loads generated in the longitudinal vehicle direction at the time of such operations as the starting and the stopping of the vehicle, without considerably enhancing the strength of the fastening members 70 themselves.

(2) The main frame 20 and the seat rail 30 are separate bodies from each other. The fastening members 70 are provided only on the main frame 20, and are provided at four parts including front left, front right, rear left, and rear right parts of a lower portion of the main frame 20. Therefore, it is possible to restrain an influence of external forces applied to the main frame 20 from being exerted on the seat rail 30, and also to restrain an influence of external forces applied to the seat rail 30 from being exerted on the main frame 20. Consequently, it is possible to more favorably cope with the loads which are generated in the longitudinal vehicle direction at the time of such operations as the starting and the stopping of the vehicle.

(3) The first knock pin 81 set along a direction orthogonal to the vehicle widthwise direction and/or the second knock pin 82 set along the vehicle widthwise direction are provided as the knock pin. This makes it possible, by appropriately providing the first and/or second knock pin 81 and/or 82, to cope with loads which are exerted in the longitudinal and widthwise directions of the vehicle. Consequently, it is possible to prevent (or at least remarkably restrain) slippage from occurring on the fitting surfaces (mating surfaces) F1 in the fastening portions.

(4) The first knock pins 81 are provided near the front-side two or the rear-side two of the fastening members 70 provided at four parts including front left, front right, rear left, and rear right parts of a lower portion of the main frame 20, and are located under the respective fastening members 70. This makes it possible to prevent slippage on the fitting surfaces F1 from occurring when a reaction force from a road surface is inputted, while minimizing a rise in cost.

If it is intended to provide the first knock pins 81 at all of the above-mentioned four parts, a high dimensional accuracy would be demanded among the component parts concerned, leading to a rise in cost.

In the case where the first knock pins 81 are arranged at the front-side two or the rear-side two of the above-mentioned four parts, on the other hand, it is possible to prevent slippage at the fitting surfaces F1 from occurring when a reaction force from a road surface is inputted, while reducing a rise in cost as much as possible.

(5) The second knock pins 82 are provided under the respective fastening members 70 which are provided at four parts including front left, front right, rear left, and rear right parts of a lower portion of the main frame 20. Each second knock pin 82 includes the male screw portion 82s for screw coupling with the female screw portion 20s provided in the main frame 20, and the fitting portion 82p which is located more to the tip side than the male screw portion 82s and which fits to the fitting portion 50h provided in the engine 50. The fitting of the second knock pins 82 and the engine 50 to each other ensures that a force tending to rotate the main frame 20 about the fastening member 70 can be further reduced.

In addition, although the second knock pins 82 are provided at the four parts including the front left, front right, rear left, and rear right parts, all the second knock pins 82 are directed in the vehicle widthwise direction, so that they do not deteriorate workability. Further, the female screw portions 20s in the main frame 20 and the fitting portions 50h in the engine 50 are provided along the same direction, so that they can be easily produced with high accuracy. Thus, the second knock pins 82 would not readily lead to a rise in cost.

(6) The first knock pin 81 is located between the fastening member 70 and the second knock pin 82 in the longitudinal vehicle direction. Thus, the first knock pin 81 is provided in such a position that the gap between the fitting surfaces F1 would not easily be enlarged when a force tending to cause slippage on the fitting surfaces F1 is exerted. Consequently, the preventive effect of the first knock pins 81 on slippage at the fitting surfaces F1 is enhanced.

(7) The engine 50 has the V-bank configuration in which the cylinders 51 and 52 are arranged in a V-shape in a side view. In addition, the rear portion 51r of the front bank 51 and the front portion 52f of the rear bank 52 are fastened by the fastening members 70. The fastening member 70, the first knock pin 81, and the second knock pin 82 are arranged in this order along the direction from the center line C1 of the V-bank configuration toward an outer side in the longitudinal vehicle direction. Therefore, an external appearance which is symmetric with respect to the center line C1 of the V-bank configuration can be obtained, and the assemblability is enhanced.

(8) The mating surfaces F1 between the main frame 20 and the engine 50 where the first knock pin 81 is accommodated are provided in the four places including the front left, front right, rear left, and rear right places. Further, the mating surface F1 and the center line C1 of the V-bank configuration are orthogonal to each other in a side view. Therefore, an external appearance which is symmetric with respect to the center line C1 of the V-bank configuration can be obtained, and the assemblability is enhanced.

(9) The intake funnel 53 is provided between the cylinders 51 and 52 which are arranged in the V-shape in a side view. In addition, the intake funnel 53 opens into the air cleaner case 21 formed inside the main frame 20. Further, the dirty side 21d of the air cleaner case 21 is provided with the water drain hole 22 through which to release water that tends to accumulate in the dirty side 21d. Accordingly, an efficient utilization of the main frame 20 can be achieved.

(10) According to this saddle type vehicle, the pivot plates 40 and the seat rails 30 are separate bodies from each other. This ensures that restrictions in regard of weight and layout can be reduced. Consequently, the vehicle can be made slimmer and lighter in weight.

In the case where the pivot plates 40 and the seat rails 30 are separate bodies from each other as aforementioned, if a structure in which the upper end 61 of the shock absorber 60 is supported by the seat rails 30, for example, is adopted, the following problem would be generated. When a high load from the shock absorber 60 is inputted to the seat rails 30, the fitting surfaces in the fastening portions where the seat rails 30 are fastened to the main frame 20 and the pivot plates 40 may slip relative to each other, depending on the fastening structure. In such a situation, changes in dimension or in the rigidity of fastening may be brought about.

On the other hand, this saddle type vehicle has a structure wherein the seat rail 30 is attached to the main frame 20 at one front-side end 31 thereof and to the pivot plate 40 at the other front-side end 32 thereof. In addition, the main frame 20 and the seat rail 30 are provided with the first fastening portion 91 where they are fastened to each other by the first fastening members 71 in the vertical direction. Also, the pivot plate 40 and the seat rail 30 are provided with the second fastening portion 92 where they are fastened to each other by the second fastening members 72 in the vehicle widthwise direction. This means that the seat rail 30 is provided with the first and second fastening portions 91 and 92 for fastening in different directions, namely, in the vertical direction and the vehicle widthwise direction. Even when a high load is inputted, therefore, relative slippage on fitting surfaces F2 and F3 (see FIGS. 2(c) and 2(d)) in the fastening portions would not readily be generated. Accordingly, changes in dimension or in the rigidity of fastening can be restrained effectively.

(11) The upper end 61 of the shock absorber 60 is connected to the seat rail 30 by the upper-end connecting portion 93. In addition, the first fastening portion 91, the second fastening portion 92 and the upper-end connecting portion 93 are arranged in this order from the front side of the vehicle in a side view. When a load from the shock absorber 60 is inputted to the seat rail 30, therefore, the action of a force tending to rotate the seat rail 30 about the second fastening portion 92 where the fastening is in the vehicle widthwise direction can be favorably received by the first fastening portion 91 where the fastening is in the vertical direction.

(12) Either the first fastening portion 91 or the second fastening portion 92 is provided with the knock pin 83, whereby either the first fastening portion 91 or the second fastening portion 92 can be freed from the possibility that a slipping load would be exerted on the fitting surfaces therein. In addition, with the knock pin 83 provided in only one of the first fastening portion 91 and the second fastening portion 92, it is possible to absorb discrepancies among component parts.

(13) In this exemplary embodiment, the knock pin 83 is provided in the first fastening portion 91. Since the fastening in the first fastening portion 91 is made by the first fastening members 71 in the vertical direction, the knock pin 83 can be easily put in position from above. Accordingly, an enhanced workability is ensured.

(14) According to this saddle type vehicle, the pivot plate 40 and the seat rail 30 are separate bodies from each other. This ensures that restrictions in regard of weight and layout can be reduced. Therefore, the saddle type vehicle can be made slimmer and lighter in weight.

Moreover, the upper-end connecting portion 93 for the shock absorber 60 is provided on the cross member 100 located between the left and right seat rails 30. The cross member 100 is a separate body from the seat rails 30, and both its ends 101 are supported by the recesses 35 provided in the left and right seat rails 30 at the inner sides of the seat rails 30 so as to face each other. Furthermore, the cross member 100 is fastened to the seat rails 30 by the cross member fastening members 73. Therefore, the material of the cross member 100, on which the load from the shock absorber 60 acts directly, can be made different from the material of the seat rails 30. Accordingly, it is possible, by raising the rigidity of only the cross member 100, to lighten the overall weight of the vehicle, and to enhance the productivity.

For instance, the seat rails 30 may be a die casting of aluminum, whereas the cross member 100 may be a wrought product of aluminum. The wrought products of aluminum are three to four times higher in material strength than die castings of aluminum.

(15) The upper surface 35b of the recess 35 forms a fitting surface, and the upper surface 102 of the cross member 100 makes contact with this fitting surface 35b. The cross member fastening member 73 has only its tip portion 73s screw-coupled to the screw receiving portion 37 provided in an upper portion of the seat rail 30, and has its other portion and the head portion 73h fitted in the through-hole 107 provided in the cross member 100 and to the lower portion of the seat rail 30. This configuration ensures that the loads from the shock absorber 60 can be received mainly by the fitting surface 35b so that no high load will be exerted on the screw coupling portion (73s, 37).

(16) The seat rails 30 are each produced using a mold whose mold parting direction coincides with the vehicle widthwise direction, whereas the cross member 100 is composed of an extruded member or is produced using a mold whose mold parting direction coincides with the vertical direction. This produces the following effects.

Where the cross member 100, which receives the upper end 61 of the shock absorber 60, and the seat rails 30 are separate bodies from each other, the cross member 100 and the seat rails 30 can be produced using respective molds which are different in mold parting direction.

Therefore, a required strength can be secured while realizing a lighter overall weight.

More particularly, a configuration may be adopted wherein the seat rails 30 are each molded using a mold whose mold parting direction coincides with the vehicle widthwise direction, whereas the cross member 100 is composed of an extruded member or is produced using a mold having a mold parting direction coincides with the vertical direction. In this case, the extrusion direction or the mold parting direction relevant to the cross member 100 can be substantially conformed to the direction in which the load from the shock absorber 60 is received. Therefore, a required strength can be secured while rendering the cross member 100 lighter in weight. On an overall structure basis, also, a required strength can be secured while realizing a lighter weight.

In addition, regarding the seat rail 30, a reinforcement rib 38 projected inward in the vehicle widthwise direction or the like portion can be easily produced. In regard of the cross member 100, the ribs 104(L, R) can be easily produced.

(17) The seat rail 30 is Y-shaped in a side view, and the first fastening portion 91 and the second fastening portion 92 are provided at end portions of the arms of the Y-shape. Therefore, a portion S1 between the arms of the Y-shape (see FIG. 2(b)) can be made to be void, so that the seat rail 30 can be made lighter in weight.

(18) As shown in FIG. 2(c'), the first fastening member 71 may be so configured that the fastening at the first fastening portion 91 is made obliquely from outside toward inside in the vehicle widthwise direction, as viewed from the front side of the vehicle. In this case, the fastening operation is facilitated.

(19) The shock absorber 60 is connected to the cross member 100 by the shock absorber connecting member 74 provided along the vehicle widthwise direction. In addition, the seat rail 30 is provided therein with the tool insertion hole 36 on the extension line of the axial direction of the shock absorber connecting member 74. Therefore, the shock absorber 60 can be easily removed while working from the outer side in the vehicle widthwise direction, by way of the tool insertion hole 36 provided in the seat rail 30.

(20) The shock absorber 60 is disposed in a position with an offset from the vehicle body center line C2 toward the side from which the shock absorber connecting member 74 is inserted. Therefore, the shock absorber 60 can be further easily removed while working from the outer side in the vehicle widthwise direction, by way of the tool insertion hole 36 provided in the seat rail 30.

(21) The cross member 100 is provided, on the outer sides in the vehicle widthwise direction of its upper-end connecting portion 93 for connection to the shock absorber 60, with the left and right lightening holes 103L and 103R that are different in size. The lightening holes 103L and 103R are provided with the ribs 104L and 104R along its diagonal line, respectively. The thickness t2 of the rib 104R of the larger lightening hole 103R is greater than the thickness t1 of the rib 104L of the smaller lightening hole 103L. Therefore, it is possible to restrain deformation of the cross member 100, which is liable to be inclined due to a load inputted from the shock absorber 60 disposed with an offset as aforementioned.

(22) The cross member fastening members 73 are mounted substantially in parallel to the axis a1 of the shock absorber 60 in a side view. Therefore, the load from the shock absorber 60 can be efficiently received by the cross member 100 and the seat rails 30.

(23) Each seat rail 30 is attached to the main frame 20 at its one front-side end 31 and to the pivot plate 40 at its other front-side end 32. In addition, the lower end 62 of the shock absorber 60 is attached to the engine 50 and the swing arm 5 through the link member 63. Therefore, mounting of the seat rails 30 to the engine 50, which is a rigid member, can be avoided. This, together with the fact that the lower end 62 of the shock absorber 60 is attached to the engine 50 and the swing arm 5 through the link member 63, makes it possible to secure shock absorbing properties in the vehicle as a whole.

While the exemplary embodiment of the present invention has been described above, the invention is not limited to the above embodiment, and various modifications can be made, as required, within the spirit and scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle vehicle comprising:
a head pipe;
a main frame extending rearwardly from the head pipe; and
a seat rail located rearwardly of the main frame, the seal rail being adapted to support a seat;
wherein the main frame is fastened to an engine by a fastening member being directed from an outer side toward an inner side in a vehicle widthwise direction; and
a knock pin including first and second knock pins provided between the main frame and the engine, in a position adjacent to the fastening member;
wherein the first knock pin is set along a direction orthogonal to the vehicle widthwise direction and the second knock pin is set along the vehicle widthwise direction and wherein the first knock pin is located between the fastening member and the second knock pin in a longitudinal direction of the vehicle.

2. The saddle vehicle according to claim 1, wherein the main frame and the seat rail are separate bodies from each other, and the fastening member is provided only on the main frame, and is provided at each of four parts including front left, front right, rear left, and rear right parts of a lower portion of the main frame.

3. The saddle vehicle according to claim 1, wherein the first knock pin is provided at each of a front-side or a rear-side of the fastening member including the front left, front right, rear left, and rear right parts of the lower portion of the main frame, the first knock pin being located under the fastening member.

4. The saddle vehicle according to claim 1,
wherein the second knock pin is provided under the fastening member at a front left, front right, rear left, and rear right parts of the lower portion of the main frame; and the second knock pin includes a male screw portion and a fitting portion, the male screw portion being for screw coupling with a female screw portion provided in the main frame, the fitting portion being located more to a tip side than the male screw portion and being for fitting to a fitting portion provided in the engine.

5. The saddle vehicle according to claim 1, wherein the engine has a V-bank configuration in which cylinders are arranged in a V-shape in a side view, in which a rear portion of a front bank and a front portion of a rear bank are fastened by the fastening member, and in which the fastening member, the first knock pin, and the second knock pin are arranged in this order along a direction from a center line of the V-bank configuration toward an outer side in the longitudinal direction of the vehicle.

6. The saddle vehicle according to claim 3, wherein the engine has a V-bank configuration in which cylinders are arranged in a V-shape in a side view, in which a rear portion of a front bank and a front portion of a rear bank are fastened by the fastening member, and in which the fastening member, the first knock pin, and the second knock pin are arranged in this order along a direction from a center line of the V-bank configuration toward an outer side in the longitudinal direction of the vehicle.

7. The saddle vehicle according to claim 5,
wherein a mating surface between the main frame and the engine where the first knock pin is accommodated is provided in each of four places including front left, front right, rear left, and rear right places; and
the mating surface and the center line of the V-bank configuration are orthogonal to each other in the side view.

8. The saddle vehicle according to claim 5, wherein an intake funnel is provided between the cylinders arranged in the V-shape in the side view, the intake funnel is opening into an air cleaner case formed inside the main frame, and a dirty side of the air cleaner case is provided with a water drain hole through which to release water that tends to accumulate in the dirty side.

9. The saddle vehicle according to claim 7, wherein an intake funnel is provided between the cylinders arranged in the V-shape in the side view, the intake funnel is opening into an air cleaner case formed inside the main frame, and a dirty side of the air cleaner case is provided with a water drain hole through which to release water that tends to accumulate in the dirty side.

10. A saddle vehicle comprising:
a main frame; and
a seat rail located rearwardly of the main frame;
a fastening member for fastening the main frame to an engine, said fastening member being directed from an outer side toward an inner side in a vehicle widthwise direction; and
a knock pin including first and second knock pins provided between the main frame and the engine, in a position adjacent to the fastening member;
wherein the first knock pin is set along a direction orthogonal to the vehicle widthwise direction and the second knock pin is set along the vehicle widthwise direction and wherein the first knock pin is located between the fastening member and the second knock pin in a longitudinal direction of the vehicle.

11. The saddle vehicle according to claim 10, wherein the main frame and the seat rail are separate bodies from each other, and the fastening member is provided only on the main frame, and is provided at each of four parts including front left, front right, rear left, and rear right parts of a lower portion of the main frame.

12. The saddle vehicle according to claim 10, wherein the first knock pin is provided at each of a front-side or a rear-side of the fastening member including the front left, front right, rear left, and rear right parts of the lower portion of the main frame, the first knock pin being located under the fastening member.

13. The saddle vehicle according to claim 10,
wherein the second knock pin is provided under the fastening member at a front left, front right, rear left, and rear right parts of the lower portion of the main frame; and the second knock pin includes a male screw portion and a fitting portion, the male screw portion being for screw coupling with a female screw portion provided in the main frame, the fitting portion being located more to a tip side than the male screw portion and being for fitting to a fitting portion provided in the engine.

* * * * *